Figure 1:
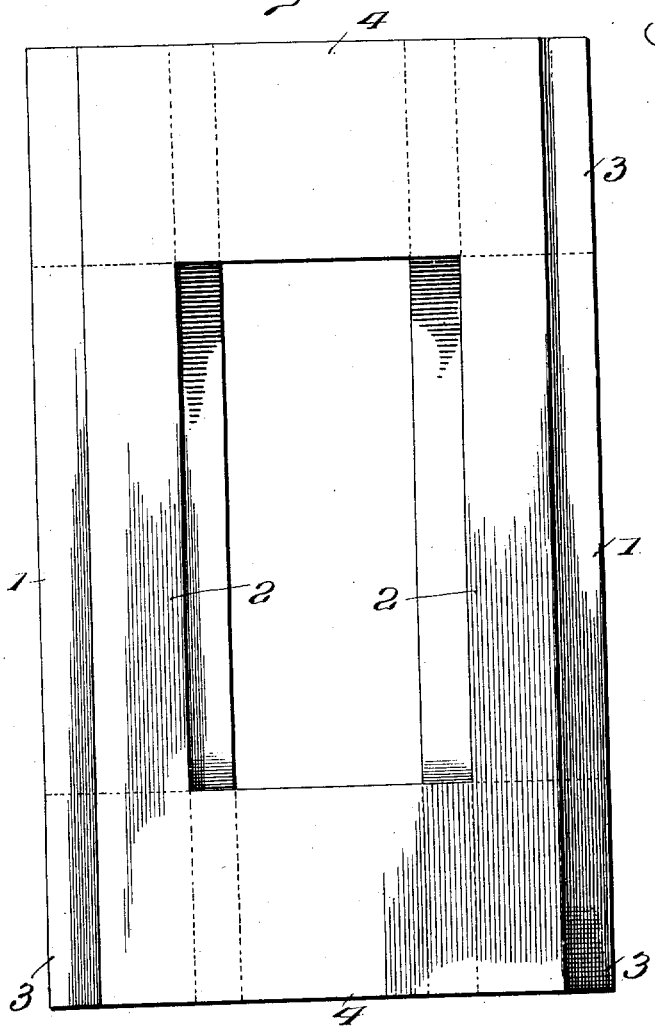

N. A. WOLCOTT & W. C. WOODLAND.

TRANSFORMER.

APPLICATION FILED MAY 13, 1914.

Reissued Nov. 17, 1914. 13,830.

Witnesses:

W. A. Williams

Francis S. Hagner

Inventors:

N. A. Wolcott and

W. C. Woodland.

By

Attorney

THE NORRIS PETERS CO., PHOTO-LITHO., WASHINGTON, D. C.

UNITED STATES PATENT OFFICE.

NEWTON A. WOLCOTT AND WILLIAM C. WOODLAND, OF WARREN, OHIO, ASSIGNORS TO THE PACKARD ELECTRIC COMPANY, OF WARREN, OHIO, A CORPORATION OF OHIO.

TRANSFORMER.

13,830. Specification of Reissued Letters Patent. Reissued Nov. 17, 1914.

Original No. 1,091,995, dated March 31, 1914. Serial No. 561,010. Application for reissue filed May 13, 1914. Serial No. 838,397.

*To all whom it may concern:*

Be it known that we, NEWTON A. WOLCOTT and WILLIAM C. WOODLAND, both of Warren, in the county of Trumbull and State of Ohio, have invented certain new and useful Improvements in Transformers; and we do hereby declare the following to be a full, clear, and exact description of the invention, such as will enable others skilled in the art to which it appertains to make and use the same.

It is the customary practice in modern transformer construction to use what is known as reduced core section, that is, the portion of the iron which is directly under the winding is reduced in cross-section so as to allow a shorter mean turn of copper.

In such transformers the laminations of the legs are of different widths, that is, they are composed of central sections and outer narrower sections, forming a figure substantially +-shaped in cross-section, wherein one of the bars of the cross may be considered as extending all the way across the figure. These leg sections are connected respectively by yoke sections in which heretofore no account has been taken of the difference in the ratio of the magnetic density between the portions of the yoke connecting the inner or more extended leg sections and such leg sections, and the magnetic density in the portions of the yoke connecting the outer or narrower leg sections and such narrow leg sections themselves. For example, while the ratio of magnetic density between the portions of the yokes connecting the more extended or intermediate sections of the legs has been, we will say for example, approximately one, or unity, the ratio between the magnetic density of the portion of the yoke connecting the outer or more restricted leg sections and such leg sections has borne no such equality, the density of the more restricted leg sections being much greater than that of the portions of the yokes connecting such parts. The result of such transformer construction is an inequality of magnetic density in the yokes which causes the lines of force in the yoke sections of greater magnetic density, instead of passing straight on, to find an easier path in the portions of lesser magnetic density and cross over thereto, thereby producing wasteful eddy currents which show up as increased core loss.

It is the primary object of this invention to prevent such increase in core loss by more nearly equalizing the magnetic density in the various parts of the yokes.

It is also the object of this invention to provide a transformer having yokes in every part of the section of which yokes individually considered the magnetic densities are approximately equal, and having legs in every part of which legs individually considered the magnetic density is approximately equal.

Figure 3:
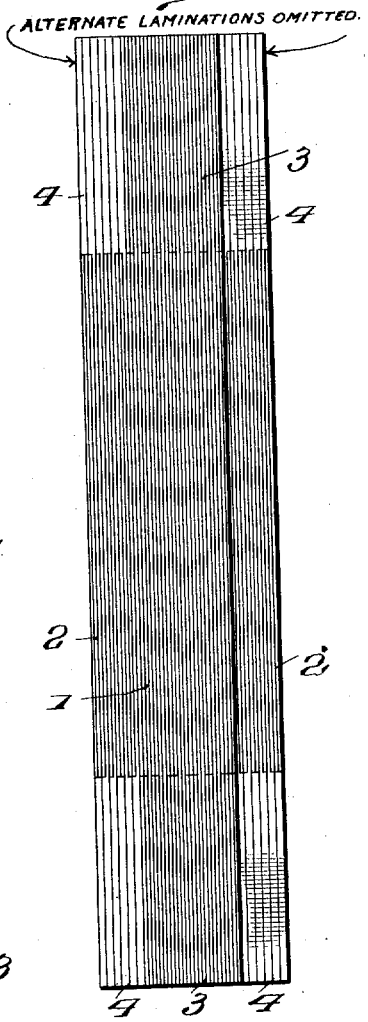
Figure 2:
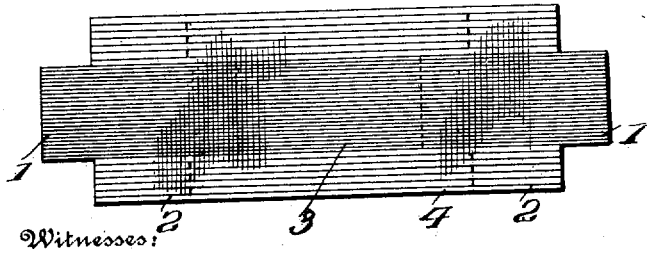

In order to more fully describe our invention, reference will be had to the accompanying drawings wherein, Figure 1 is a view in side elevation of one form of transformer constructed in accordance with our invention. Fig. 2, a top plan view thereof. Fig. 3, an edge view in elevation of said transformer core.

In the accompanying drawings, 1 designates the central or wide leg sections connected by yoke sections 3; 2 the narrower leg sections, and 4, yoke sections connecting the said narrower leg sections 2. These sections are as usual made up of interleaved laminations of suitable magnetic metal, and the number of laminations composing the yoke sections 3, correspond, or nearly so, with the number of laminations of leg sections 1. If, however, the laminations of yoke sections 4 equaled in number those of the leg sections 2, as has been the custom, without making provision for equalizing the magnetic density of the parts of the yokes connecting with the different leg sections, it will be seen that the yoke sections 3 would carry a greater magnetic density than yoke sections 4. In other words, the ratio of the magnetic density of sections 1 to sections 3 would not be at all the same as the density ratio of sections 2 to sections 4, assuming the sections 4 to contain the same number of laminations as sections 2. For example, while the magnetic density in sections 1 and 3 may be approximately the same, the magnetic density in sections 2 would be much greater than sections 4. The result would be that the magnetic lines in the yoke, in order to find an easier path, would cross from the sections 3 into sections 4 of the yoke, and thereby set up eddy currents as described.

According to our invention, we omit enough of the plates in yoke sections 4 to make the net area thereof bear approximately the same ratio to that of leg sections 2 as the yoke sections 3 bear to leg sections 1. The superficial area of the yoke sections may remain unchanged. As the net cross-sectional area of the yoke sections 4 is usually over twice that of leg sections 2, the desired end may be attained by omitting about one-half the plates, that is to say, every other plate ordinarily required in making up the yoke sections 4 connecting the narrow leg sections.

Our aim is to equalize the magnetic densities in all parts of the yokes considered separately and to equalize the magnetic densities in all parts of the legs considered separately so as to prevent the magnetic lines of force from straying out of their proper paths.

By means of our invention, not only do we minimize the eddy-currents, resulting in lower core losses, but we, at the same time, effect a saving in the material, and these are items of considerable importance in view of the urgent demand for lower core losses, and also the high cost of silicon-steel from which transformer cores are preferably made.

We claim as our invention:

In a transformer, a laminated closed magnetic core comprising parallel legs composed of sections of different widths and yokes connecting said legs, the yoke sections connecting the reduced widths of the legs being composed of a different number of laminations from the leg sections to which they are connected.

In testimony whereof, we have signed this specification in the presence of two subscribing witnesses.

NEWTON A. WOLCOTT.
WILLIAM C. WOODLAND.

Witnesses:
L. L. KINGSLEY,
R. H. SNYDER.

Copies of this patent may be obtained for five cents each, by addressing the "Commissioner of Patents, Washington, D. C."